(12) United States Patent
LaButte et al.

(10) Patent No.: US 6,876,993 B2
(45) Date of Patent: Apr. 5, 2005

(54) METHOD AND SYSTEM FOR GENERATING MANAGEMENT SOLUTIONS

(75) Inventors: Brian LaButte, Mississaugo (CA); Larry Gordon Mayhue, Markham (CA); Ida Mae Olin, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 663 days.

(21) Appl. No.: 09/952,296

(22) Filed: Sep. 14, 2001

(65) Prior Publication Data

US 2003/0055804 A1 Mar. 20, 2003

(51) Int. Cl.$^7$ .............................................. G06F 17/00
(52) U.S. Cl. ........................................ 706/47; 707/102
(58) Field of Search ............................ 706/47; 707/102

(56) References Cited

U.S. PATENT DOCUMENTS

| | | | |
|---|---|---|---|
| 5,960,200 A | 9/1999 | Eager et al. | 717/147 |
| 6,003,021 A | 12/1999 | Zadik et al. | 706/47 |
| 6,067,525 A * | 5/2000 | Johnson et al. | 705/10 |
| 6,167,406 A | 12/2000 | Hoskins et al. | 707/102 |
| 6,738,746 B1 * | 5/2004 | Barnard et al. | 705/7 |

OTHER PUBLICATIONS

Powell et al, "JoinIT—A Knowledge Trading Development for the 21$^{st}$ Century", IEEE PICMET Jul. 1999.*

* cited by examiner

Primary Examiner—George Davis
(74) Attorney, Agent, or Firm—Scully, Scott, Murphy & Presser; William E. Schiesser (57) ABSTRACT

A method and system for generating a management solution for a client having an organization. The method comprises the steps of providing a pre-defined solution of documentation, executable code, and installation aids, having pre-determined processes, roles and skills, and tool function; assessing the impact of implementing said solution within said organization of said client; building a training plan of needed training in response to said impact; and defining a client data processing infrastructure needed to implement said pre-defined solution at said client. The method comprises the further steps of identifying said pre-determined processes, roles and skills, and tool function requiring changes for said client; completing change worksheets with said client; processing said change worksheets to generate personalized executable code for said changes; running test cases on said solution with said changes; and delivering said data processing infrastructure, said documentation, said personalized executable code, said installation aids, and said needed training to said client.

18 Claims, 8 Drawing Sheets

METHOD AND SYSTEM FOR GENERATING MANAGEMENT SOLUTIONS

BACKGROUND OF THE INVENTION

1. Field of the Invention

This invention generally relates to methods and systems for generating management solutions; and more specifically, to methods and systems for providing management solutions quickly based upon current offerings and capabilities. Even more specifically, the invention relates to such methods and systems that are particularly well suited for addressing incidents, changes and problems that occur in the Information Technology (IT) service delivery environment.

2. Prior Art

The rapid changes in today's business environment are putting increasingly difficult demands on IT staff and capabilities. It is becoming increasingly important to have a reliable, available IT infrastructure to support these business requirements. Key to providing this solid foundation is the effective monitoring and control of that infrastructure. Years of experience working with clients to address IT management have shown that successful solutions are built upon a common foundation: an integrated systems management solution.

Yet, as business is rapidly changing, so is IT. And IT has issues of its own. For example, a solid infrastructure is needed to support the business and its fast pace of change, and management of these infrastructures requires technology-enabled processes with skilled people and information. At the same time, there are increasing pressures on IT to control costs, expand function, and improve the quality of service; yet people with the right IT skills are hard to find. A good solution is needed quickly.

SUMMARY OF THE INVENTION

An object of this invention is to provide a method and system for generating management solutions.

Another object of the present invention is to manage incidents, changes and problems occurring in the IT service delivery environment.

A further object of the invention is to facilitate the rapid, successful restoration of IT service to the customers of IT following an unplanned deviation from expected service.

These and other objectives are attained with a method and system for generating a management solution for a client having an organization. The method comprises the steps of providing a pre-defined solution of documentation, executable code, and installation aids, having pre-determined processes, roles and skills, and tool function; assessing the impact of implementing said solution within said organization of said client; building a training plan of needed training in response to said impact; and defining a client data processing infrastructure needed to implement said pre-defined solution at said client. The method comprises the further steps of identifying said pre-determined processes, roles and skills, and tool function requiring changes for said client; completing change worksheets with said client; processing said change worksheets to generate personalized executable code for said changes; running test cases on said solution with said changes; and delivering said data processing infrastructure, said documentation, said personalized executable code, said installation aids, and said needed training to said client.

Preferably, the invention employs a pre-built solution based upon "best of breed" practices. Processes may be defined and respected vendor products may be customized to enable those processes. (These process definitions are aligned to both ITIL {IT infrastructure Library} and IT Process Model {ITPM}.) This invention also defines the kinds of people needed to execute that solution, and what skills they should have. The solution also contains the procedures that these people will need in their day-to-day execution of the solution.

This pre-defined solution will need some adapting for each particular installation: the provider will personalize this solution. Admittedly, not everything can be changed. Otherwise, the purpose of quick, "best of breed" is defeated. But the provider will tailor the solution to the organization and to some of the policies that are used to control the execution of the solution and the behavior of the people.

The solution is modularized. Today change management and incident and problem management services are available. But the structure is flexible, allowing for the addition of services either developed internally, or procured, as they become available.

The basis of the solution is a set of well defined, proven processes. The roles that execute the processes, the tool functions, and the associated information are all based upon the process design. These processes: Are based on best of breed practices; Are aligned with both ITIL and ITPM; and Include mission, goals, activities, and policies.

Correct and appropriate information is vital to the execution and management of the solution. First, the solution will provide a set of standard measurements and reports to ensure the solution is operating effectively. Secondly, the tool has been customized to ensure the appropriate data is captured, during the day-to-day execution of the solution to provide those measurements.

The technology component of the solution consists of the vender management tool, pre-customized to enable the process and workflow definitions. The tool is also personalized to each environment to ensure, for example, that incidents and problems are assigned to the correct person or organization to be handled. The personalization will be delivered as an add-on to the base product. Installation instructions and aids are also provided.

Finally a most important component of the solution is, of course, the people. A list of role descriptions and the skills necessary to perform them provide a basis to help identify, by name, the appropriate people to be assigned to those roles. Solution Procedures will give the people involved in the execution of the solution step-by-step instructions on what to do, and how to use the tools and information to do it. If training is required beyond what the technology vendor provides, the solution will provide training materials for that purpose. And the organization will also need to prepare for the acceptance of the Solution. To that end, an organization communication plan may be provided to assist with the planning.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
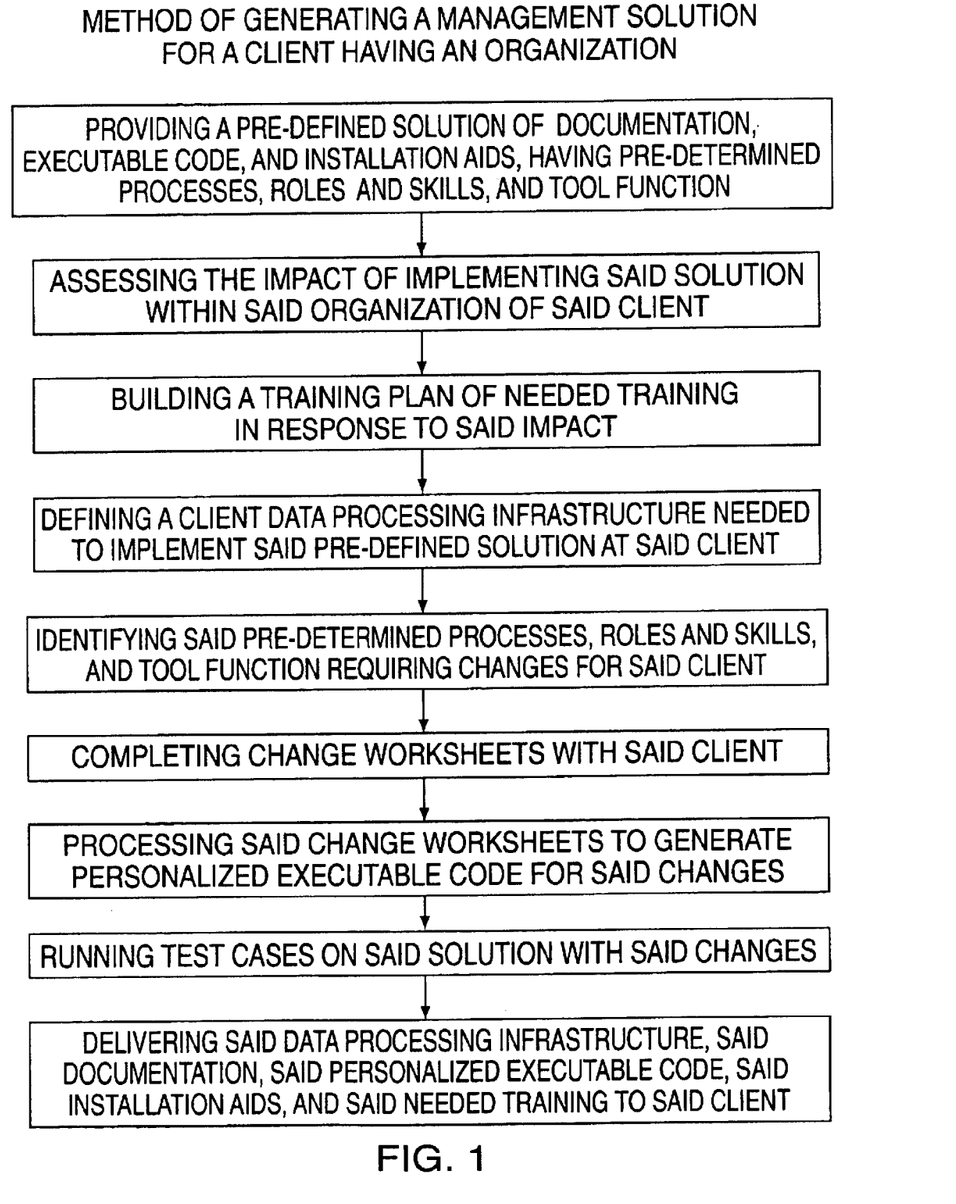
FIG. 1 outlines one method embodying the present invention.

The present invention relates to a method and system for generating management solutions, and more specifically, for generating a management solution for a client having an organization. With reference to FIG. 1, a method embodying the invention comprises the steps of providing a pre-defined solution of documentation, executable code, and installation aids, having pre-determined processes, roles and skills, and tool function; assessing the impact of implementing the solution within the organization of the client; building a training plan of needed training in response to said impact; and defining a client data processing infrastructure needed to implement the pre-defined solution at the client. The method comprises the further steps of identifying the pre-determined processes, roles and skills, and tool function requiring changes for the client; completing change worksheets with the client; processing the change worksheets to generate personalized executable code for the changes; running test cases on the solution with said changes; and delivering said data processing infrastructure, said documentation, said personalized executable code, said installation aids, and said needed training to the client.

Figure 2:
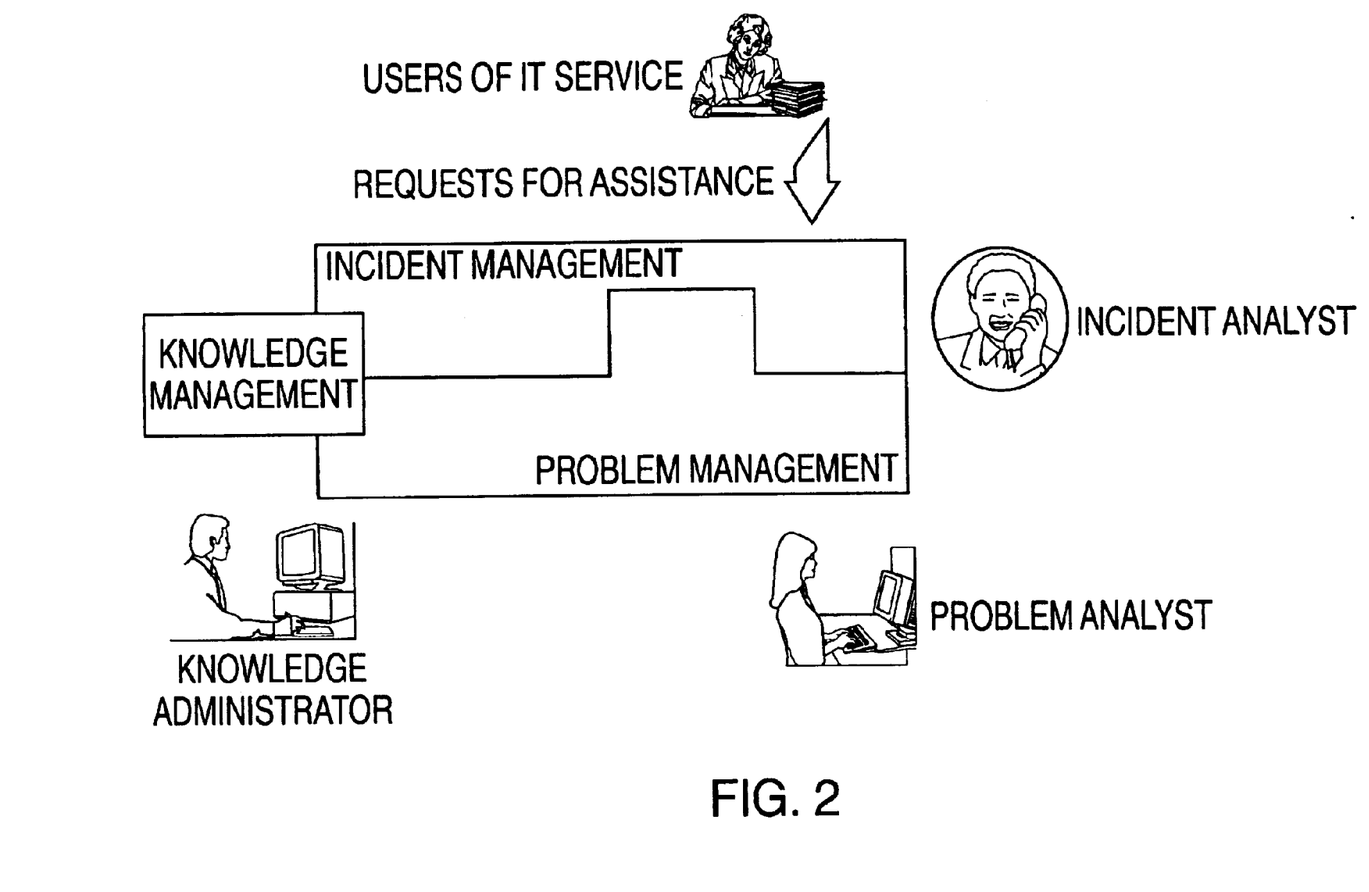
FIG. 2 illustrates components of an example of an incident and problem management solution that may be created in accordance with the present invention.

One example of a deliverable that may be created and delivered by the method of this invention is a process, referred to as an Incident and Problem Management Solution, for addressing IT incidents and problems. With reference to FIG. 2, the Incident and Problem Management Solution consists of three components: Incident Management process, Problem Management process, and some Knowledge Management tasks. The solution has combined these processes to provide a single solution that will manage all the service deviations for the IT organization.

An Incident is a deviation from the expected IT service. This could include an actual fault with IT applications or infrastructure, a misunderstanding about the use of a system from a user's viewpoint, a requirement for the reset of a password, etc.

A Problem is a deviation from the expected norm of an IT application or a component of the IT infrastructure. This could include, for example, a fault, a degradation of performance, or a lack of capacity with an IT application or infrastructure element.

Incident Management is the process that controls the entry, processing, and closure of incidents from users of IT services.

Problem Management is the process of managing problems from their detection through their final resolution. It encompasses the detection, analysis, recovery, resolution, and tracking of problems occurring in the information systems.

Knowledge Management is the process for managing the intellectual assets of the enterprise. It is a discipline that promotes a collaborative and integrated approach to the creation, capture, organization, access, and use of information assets.

The purpose of the Incident Management process is to identify, document, and resolve incidents. If quick resolution is not possible, Incident Management calls the Problem Management process for resolution and monitors the resolution progress.

The purpose of the Incident Management is to minimize the business impact of problems by optimizing the time and effort spent in circumventing and/or resolving the problem, and preventing it from happening again. A teamwork structure for technical expertise is used to facilitate the problem resolution. Finally the process provides a structure to ensure that procedural updates are made to the root-cause I/T processes to help ensure the problem will not reoccur.

The scope of incident and problem management includes all deviations from the expected IT service delivery, regardless of their impact, and regardless of the affected IT component.

The mission of Incident and Problem Management is to facilitate the rapid, successful restoration of IT service to the customers of IT following an unplanned deviation from expected service. This mission is accomplished through the combination of Incident Management and Process Management.

The goal of Incident Management is to ensure that incidents affecting users of IT services are resolved quickly. Incident Management focuses outwardly on the customer to quickly identify solutions or bypasses, if possible. Incident management is also a key driver of the Problem Management process for those incidents that cannot be resolved immediately. Its main focal points to achieve this goal are: To attempt to resolve incidents during the first call with the user; To accurately assign problems to technical support; To ensure that the users are satisfied with the resolution of incidents; and To provide polite, courteous service to ensure a high level of customer satisfaction.

The goal of Problem Management is to optimize the availability of IT service delivery by quickly circumventing and/or resolving problems. Problem Management focuses on the internal IT activities of bypassing a problem, identifying the root cause for the problem, and implementing the problem resolution. Its main focal points to achieve this goal are: To reduce the number of problems; To reduce the impact and cost of problems; and To resolve problems effectively and efficiently.

In order to achieve these goals, the present invention employs several guiding principles, which are statements that define the way in which the systems management solution is to be executed. These statements apply to all components and all executions of the solution. These statements include:

(i) A single incident and problem management solution will exist where all of the incidents and problems within the customer IT environment are managed;

(ii) All customer staff will adhere to the Incident and Problem Management solution policies, procedures, and standards.

(iii) Service Level agreements will identify objectives and expectations for both the customer and IT.

(iv) The focus will be on restoring service first, then performing root cause analysis of the problem.

(v) Circumventions and resolutions for problems and incidents will be clearly documented.

(vi) Severity levels will be defined, documented, and published.

(vii) Resolved incidents and problems that have a high probability of reoccurrence will be stored in a knowledge management repository for use in quickly resolving incidents and problems.

(viii) Incident Management will provide a single point of contact for users of IT service when that service does not meet their expectations.

(ix) Incident Management and Problem Management personnel will have access to all appropriate resource tools and information databases to assist in servicing the incident problem.

(x) Incident and problem reports will be provided and reviewed on a regular basis.

Any deviation from expected results of IT service provision is included in the scope of the Incident and Problem Management Solution. These deviations could occur on the following systems or components of IT infrastructure: System software; Database; Application software; Network software; Hardware (including Servers, Desktops, Telecommunications, and Networks); Environment systems; and Documentation.

Figure 3:
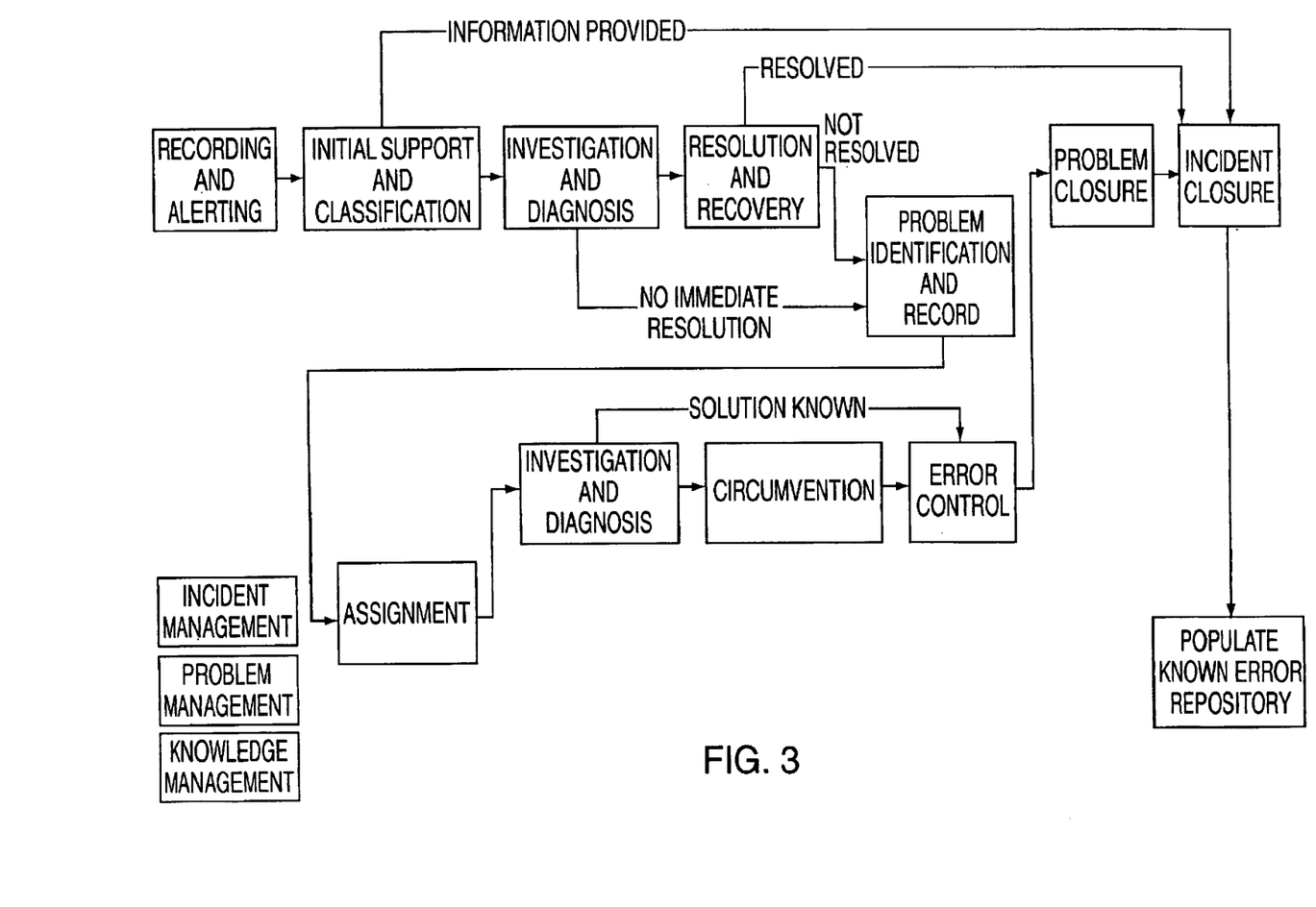
FIG. 3 depicts the standard flow of activities in the incident and problem management process of FIG. 2.

FIG. 3 depicts the standard flow of the activities in the Incident and Problem Management processes. Generally, those activities include Incident Management Activities, Problem Management Activities, and Knowledge Management Activities.

Incident Management Activities are the activities that are executed as a part of managing an incident from its inception to its completion. These activities include Recording and Alerting [Record Contact], Initial support and Classification [Assess Contact], Incident Investigation and Diagnosis [Analyze Incident], Resolution and Recovery [Resolve Incident], and Incident Closure [Close Incident].

Recording and Alerting is the starting point for the Incident Management process. This activity gathers and records information regarding the customer who has identified the incident.

Initial Support and Classification includes the gathering and recording of additional information about the incident, including the affected assets, the impact of the incident, and the symptoms of the incident.

Incident Investigation and Diagnosis determines what is required to address the incident and compares this incident to others to determine if the incident is one which is already known, and perhaps, even has a solution.

Resolution and Recovery include the tasks that attempt to resolve the incident. If the incident cannot be resolved a problem ticket will be opened for resolution of the (now identified) problem.

Incident Closure ensures that the incident information is complete and that the customer concurs with the resolution of the incident. Candidates for the Knowledge Repository are identified.

The Problem Management Activities are the set of activities to manage a problem. These activities include Identification and Recording [Identify Problem], Assignment [Assign Problem], Investigation and Diagnosis [Analyze Problem], Circumvention [Bypass the Problem], Error Control [Resolve the Problem], and Problem Closure [Close the Problem].

During Identification and Recording, the problem ticket is created and additional information about the problem may be collected. Tasks during this activity also provide for the communication about the new problem to the help desk and, if appropriate, to the entire user community.

The Assignment activity assigns the problem to a technical support area and an individual within that support area, who then captures additional information about the problem.

Investigation and Diagnosis analyzes information about the problem and once more checks for existing problems that may be the same as the problem being diagnosed.

A goal of problem management is to restore service quickly. The Circumvention activity searches for a way around the problem in order to restore full or partial service. Note that this is done before a complete analysis of the problem in order to focus on making a speedy restoration of service.

During Error Control, the root cause of the problem is identified. This is critical to finding a way to prevent the problem from reoccurring. Based upon the root cause, the solution is implemented using standard Change Management practices and the solution is validated. Candidates for the Knowledge Repository are identified.

Problem Closure includes ensuring that the problem has been adequately addressed, including the complete documentation of problem resolution activities. Candidates for the Knowledge Repository are identified.

Although Knowledge Management is a process with a wide scope, only one activity from this process is used in the Incident and Management solution. That activity, referred to as Populate Known Error Database [Populate Knowledge Repository], reviews incidents and problems that were recognized as having a high probability of reoccurring, during incident and problem management; it stores the known solutions for those incidents and problems.

Incidents and problems go through various states during their handling. The status value is used to identify the current state of the incident or problem. The Incident and Problem Management Solution uses the following status values given in Tables 1 and 2.

TABLE 1

| Incident Status Value | Description |
| --- | --- |
| Open | The incident is actively being worked on. |
| Pending Resolution | It has been determined that the incident is indeed a problem, and a problem ticket has been opened and is being worked on. The incident will remain in pending status until the associated problem has been resolved. |
| Pending Validation | A problem ticket relating to this incident has been resolved, and a check with the customer is required to validate the resolution. |
| Closed | Work on the incident has been completed. |

TABLE 2

| Problem Status Value | Description |
| --- | --- |
| Open | The problem ticket is new, and information about the ticket is being gathered. |
| Assigned | The problem ticket has been assigned to a support queue or an analyst for further research. |
| Accepted | The analyst has accepted ownership of the problem and is actively working on it. |
| Bypassed | A bypass for the problem has restored the service. |
| Resolved | A solution for the problem has been identified and implemented. |
| Closed | Work on the problem has been completed. |

Figure 4:
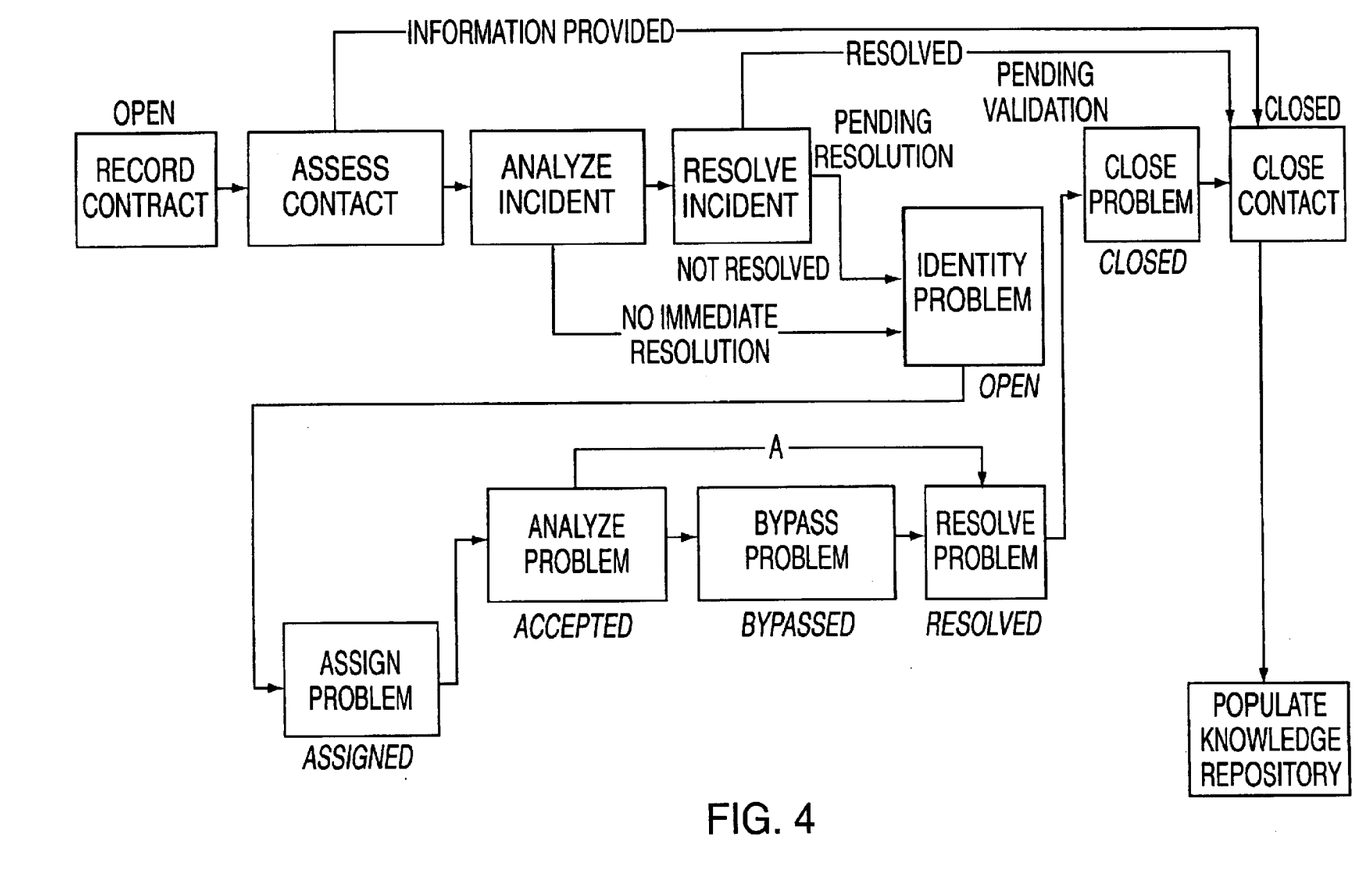
FIG. 4 shows the status fields associated with the standard flow of incident and problems through the system.

FIG. 4 shows the status fields associated with the standard flow of incidents and problems through the system.

An important characteristic of an incident or problem is the impact of the loss of the service described by the incident or the problem upon the business. This impact is reflected in the Severity Level. The Severity Level will determine which notifications will occur and when escalations will occur.

Severity levels can range from 1 (most severe) to 4 (least severe). Factors used to determine the severity levels include things such as: Number of customers affected by the condition; Type of service being disrupted; Length of the outage; and Availability of a bypass.

The severity may be changed throughout the life of an incident or problem, but only with the agreement of the customer. Descriptions of the four preferred severity levels are given below in Table 3.

TABLE 3

Severity Description

1 'Emergency'
  This is a major outage affecting a large number of customers.
  Critical business commitments cannot be met.

TABLE 3-continued

Severity Description

2 'Urgent'
  A system or application is usable, but with severe restrictions.
  Performance is severely degraded.
3 'Routine'
  This type of problem must be resolved, but leaving it unresolved
  does not affect service level agreements. A small number of
  users may be affected.
4 'Low Impact'
  This problem is not directly affecting the user's productivity,
  and is usually confined to an individual user.

To ensure that priority problems and incidents are being handled in a timely fashion, target times are established. These times vary based upon the severity level. One preferred set of target times is given in Table 4 below. (Times are elapsed times, and business days.)

TABLE 4

| | Ticket entered | Problem assignment accepted | Bypass effected and service restored | Problem resolved | Problem closed |
|---|---|---|---|---|---|
| Severity 1 | 30 minutes | 5 minutes | 2 hours | 8 hours | 2 days |
| Severity 2 | 30 minutes | 5 minutes | 4 hours | 2 days | 4 days |
| Severity 3 | 30 minutes | 1 hour | 8 hours | 5 days | 10 days |
| Severity 4 | 30 minutes | 2 hours | 4 days | 10 days | 15 days |

Automated notification of the appropriate personnel is a standard part of the Incident and Problem Management solution. The recipients of the notification depend upon the severity of the problem or incident, and a preferred set of notifications is given below in Table 5

TABLE 5

| | Incident Manager | Problem Manager | Vendor Manager(s) | Vendor (if applicable) | IT Director | IT Executive |
|---|---|---|---|---|---|---|
| Severity 1 | X | X | X | X | X | (Optional) |
| Severity 2 | X | X | X | X | (Optional) | |
| Severity 3 | | | X | | | |
| Severity 4 | | | X | | | |

Escalation is a special type of notification that indicates that a problem is not meeting the target time for its resolution or its bypass (if possible). This is a signal to management that additional attention is required to restore the affected service. One suitable set of escalation times is given in Table 6. These times, it may be noted, are measured from the time that a problem ticket enters the system.

TABLE 6

| | Problem Manager | Manager(s) | IT Director | IT Executive |
|---|---|---|---|---|
| Severity 1 | 2 hours | 4 hours | 8 hours | 12 hours |
| Severity 2 | 4 hours | 8 hours | 1.5 days | |
| Severity 3 | 8 hours | 2.5 days | | |
| Severity 4 | 3.5 days | | | |

The people who execute the Incident and Problem Management Solution are the most important component. These are complex processes that can never be totally automated by technology. The performance of the people is critical to the successful management of incidents and problems. The incident management process is especially dependent upon the people involved in the execution of the process. They are the visible interface to IT from its user community. The problem management process is also dependent upon the people involved in the execution of the process since they are the technical experts who focus on restoring service quickly. To that end, the people must be committed to the solution and aware of their roles and responsibilities in the execution of the solution.

It is possible in many ways to bypass or pay only 'lip service' to adherence to the policies of incident and problem management. The people involved must understand the importance of incident and problem management to the availability of the IT services that support important business processes. They must be educated about the effect that a highly available IT infrastructure has upon the success of the business.

The roles are described below in Tables 7–9. Note that a role is a 'hat' a person wears during the execution of his/her job responsibilities. A role is not necessarily equivalent to a person or to a job: rather the role describes the responsibilities, tasks, and skills of the person at the moment that he/she is performing the role. Given this, it is very possible that one person may fulfill more than one role in managing incidents and problems. For example, the problem manager, in assigning problems to problem analysts, may assign the problem to himself/herself and thus takes on the role of the problem analyst.

TABLE 7

Mandatory Incident Management roles are:

| Incident Management Role | Main Responsibilities |
|---|---|
| Incident Management Process Owner | Sponsors the Incident Management solution Has the responsibility and authority for the overall Incident Management Solution results |
| Incident Manager | Coordinates the day-to-day execution of Incident Management activities Manages the schedule of work within Incident Management |
| Incident Analyst | Is the primary IT interface to the end user community Handles customer requests, from initiation to resolution |

TABLE 8

Mandatory Problem Management roles are:

| Problem Management Role | Main Responsibilities |
|---|---|
| Problem Management Process Owner | Sponsors the Problem Management solution Has the responsibility and authority for the overall results of problem management |
| Problem Manager | Coordinates the day-to-day execution of Problem Management activities Ensures that problems are being resolved, based on criteria |
| Problem Queue Manager | Ensures that problems in his queue are assigned to problem analysts Ensures the availability and capability of problem analysts in his area |
| Problem Analyst | Is responsible for problem determination, problem bypass, and problem resolution Performs root cause problem identification |

TABLE 9

Mandatory Knowledge Management roles are:

| Knowledge Management Role | Main Responsibilities |
|---|---|
| Knowledge Administrator | Maintains the knowledge bases used in incident and problem management Ensures the usability and quality of knowledge base entries |

Figure 5:
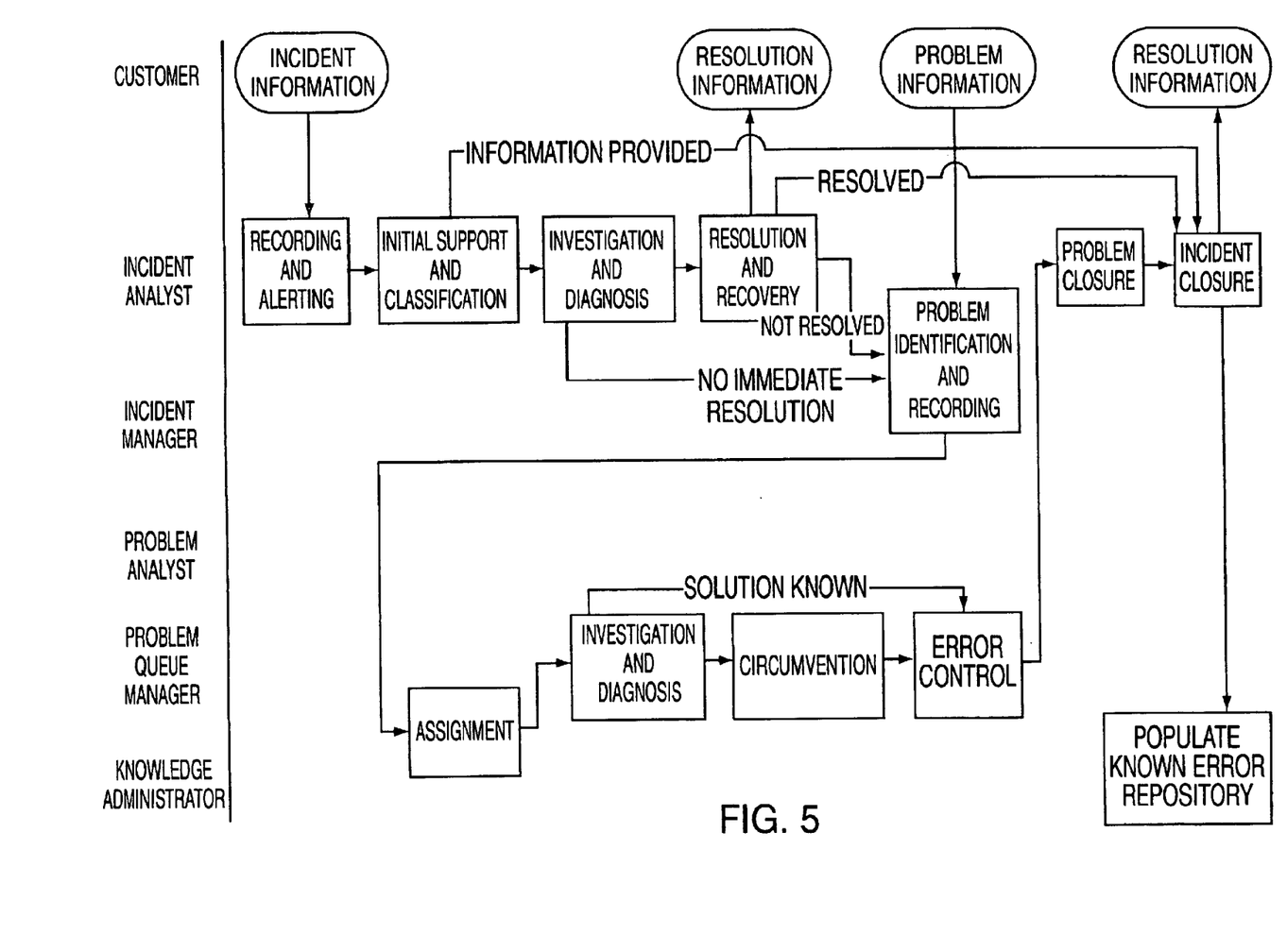
FIG. 5 depicts the roles and responsibilities in the incident and problem management execution path.

FIG. 5 depicts these roles and responsibilities in the incident and problem management execution path.

One tool suitable for supporting the incident and problem management solution is Peregrine's ServiceCenter. It provides a suite of applications to manage a company's IT enterprise and facilities. ServiceCenter comprises of a series of integrated applications and utilities designed to manage specific parts of the enterprise. The ServiceCenter applications that may be used to provide the Incident and Problem Management functions are Service Mangagement and Problem Management.

Figure 6:
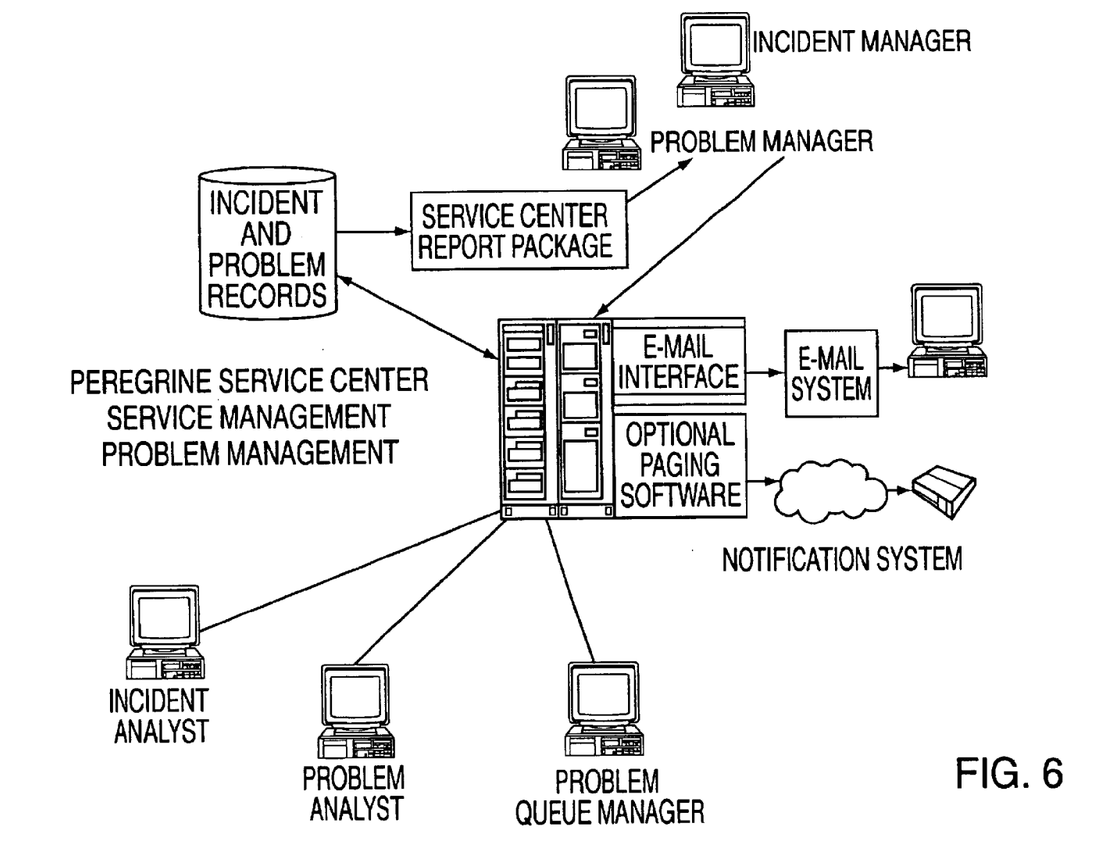
FIG. 6 is an overview of technology that may be used in the implementation of the incident and problem management solution.

With reference to FIG. 6, the ServiceCenter system runs on a server using a database to store the incident and problem records. Each user of the problem management system interfaces with the product, using either the ServiceCenter client on a workstation, or the ServiceCenter web interface. Users are given different authorities based upon their roles.

Figure 7:
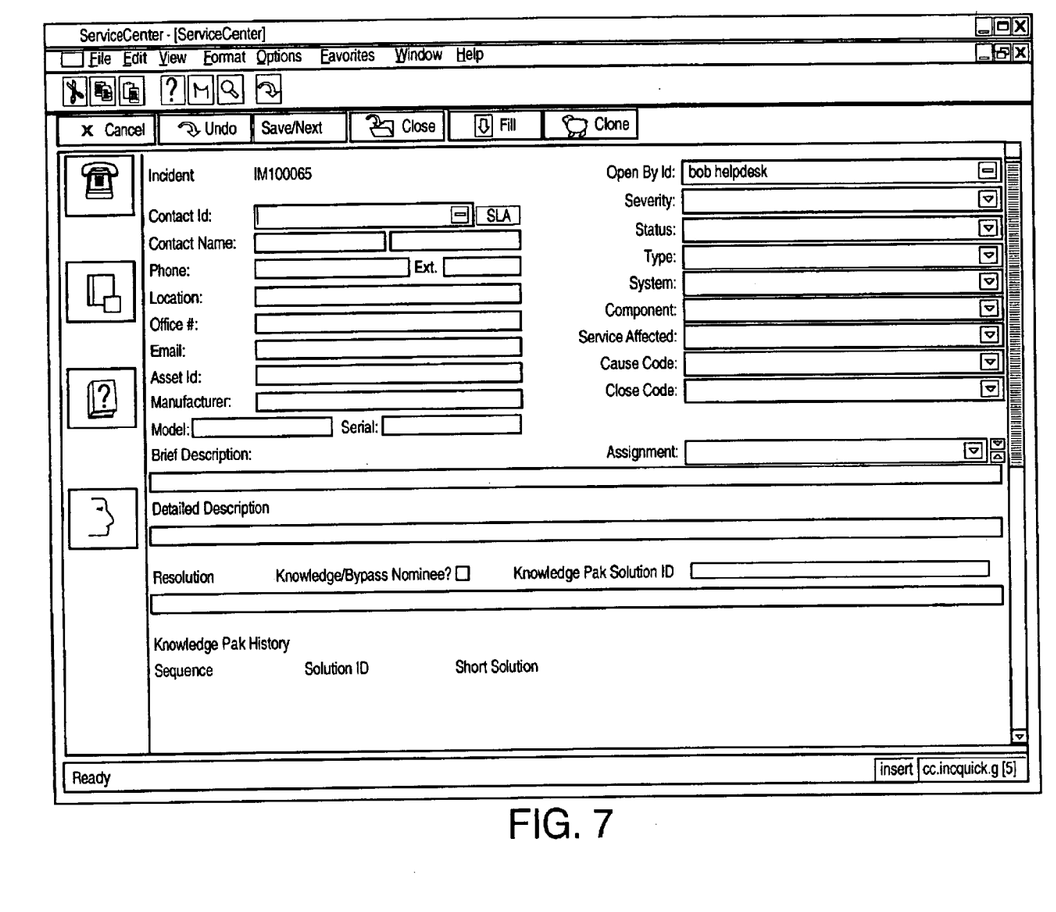
FIGS. 7 and 8 show incident and problem entry screens that may be used in the incident and problem management solution.
Figure 8:
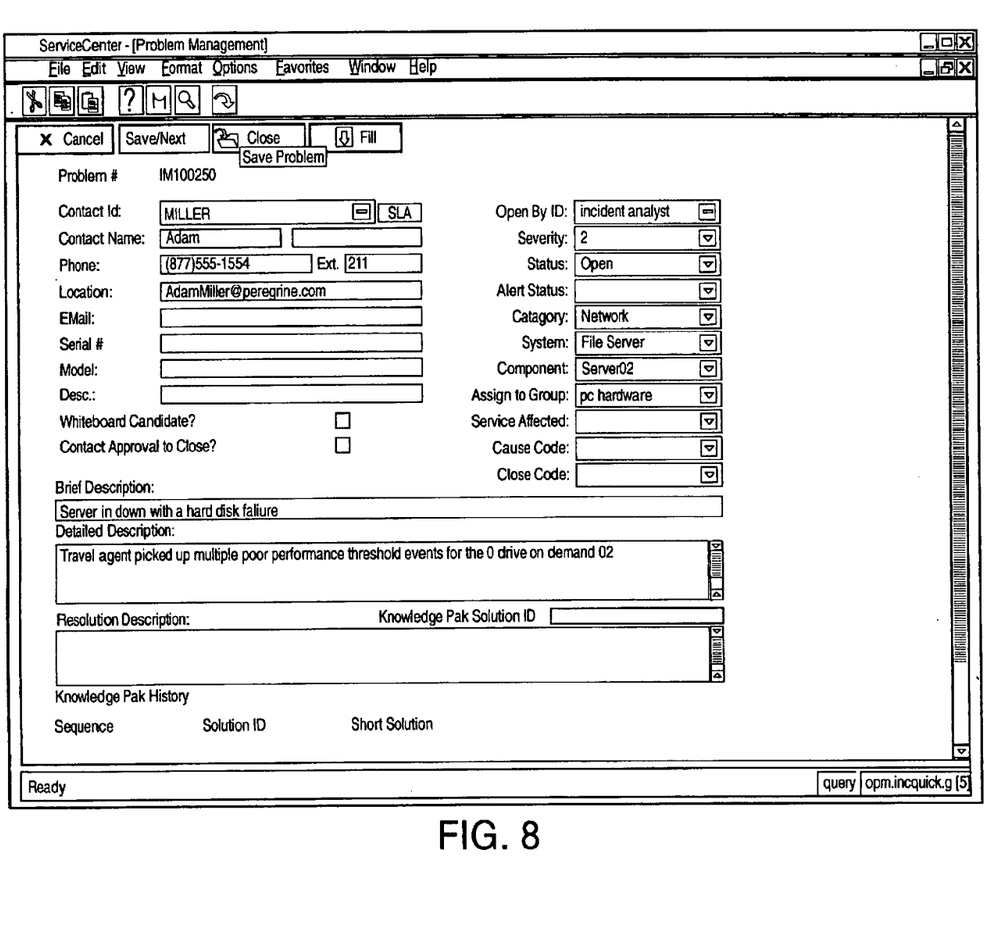

The incident and problem entry screens, shown in FIGS. 7 and 8, form the basis of the user interface. As activities within the incident and problem management solution are completed, the tool is used to support, and sometimes to enforce those activities.

Preferably, the product has the capability to notify individuals at various points during the life of an incident or problem. This notification can happen in one or several of three ways: Via ServiceCenter, the notification appears as a special icon on the individual's desktop; Via the e-mail interface, the individual receives an e-mail notification; Via a pager interface, the individual is paged.

The final portion of the incident and problem management solution is the information. There are two types of information: Individual incident and problem information; and Consolidated incident and problem information.

The individual incident and problem information is data that is stored in conjunction with the individual incident or problem. This includes: Information about the customer; Date information (time of occurrence, time of resolution); Current incident or problem status; Incident or Problem description, including categorization, severity level, and symptoms; Bypass and/or resolution activities; and Completion information.

Consolidation incident and problem information is the information that is used to trend incident and problem occurrences. Preferably, the problem and incident records are tracked and trended to determine how well the incident and problem management solution is working. This includes tracking the number of resolved or unresolved incidents and problems by various criteria, including type, severity, and time frames.

A set of Crystal reports has been predefined that will assist the Incident Manager and the Problem Manager in the everyday work of ensuring that incidents and problems are being resolved expeditiously. An additional set of reports will assist the Incident Management Process Owner and the Problem Management Process Owners in identifying areas for improvement.

There are nine categories of reports: Incident Reports, Incident Summary Reports, Incident Activity Measurement Reports, Incident Management Process Summary, Problem Reports, Problem Summary Reports, Problem Activity Measurement Reports, Problem Management Process Summary, and Knowledge Management Detailed Report.

There are two types of Incident Reports: an Incident Summary, and an Incident Index. The Incident Summary creates a one page detailed description of an incident ticket, and the Incident Index creates a listing report of all the active incidents within a supplied start and end date.

There also are two types of Incident Summary Reports: Active tickets and Closed tickets. The Incident Manager creates these reports to do trend analysis on a weekly, monthly, and yearly basis. Active tickets identify the number of active incident tickets, by type, and Closed tickets identify the number of closed incident tickets, by type, and the number of closed incident tickets, by close code. These reports are also available upon request, from the Incident Manager.

The Incident Activity Measurement Reports will provide a high level view of the key measurement used to manage each of the activities in the Incident Management Process. It will show all the defects reported for each activity, as defined by the measurements of each activity. The Incident Manager will create this report on a weekly basis for the Incident Management Process Owner.

The report will include the following key measurements: Number of customers with no profiles, or incorrect profiles; Number of incidents with the incorrect request type; Number of incidents with incorrect severity; Number of reassignments; Number of incidents with incomplete information; and Number of incidents that were not documented satisfactorily.

Incident Management Process Summary provides a high level view of the key measurements used to manage the entire Incident Management Process. The Incident manager creates this report on a monthly and yearly basis.

Problem Reports include a Problem Summary and a Problem Index. The Problem Summary will create a one page detailed description of a problem ticket, and the Problem Index report will create a listing report of all the active problems within a supplied start and end date.

There are two types of Problem Summary Reports: active tickets and closed tickets. The Problem Manager will create these reports to do trend analysis on a weekly, monthly, and yearly basis. Active tickets identify the number of active tickets by severity, the number of active tickets by type, and the number of active tickets by cause code. Closed tickets identify the number of closed problem tickets by type, number of closed problem tickets by cause code, and number of closed problem tickets that were resolved by a change. These reports are also available upon request, from the Problem Manager.

The Problem Activity Measurement Reports will provide a high level view of the key measurement used to manage each of the activities in the Problem Management Process. It will show all the defects reported for each activity, as defined by the measurements of each activity. The Problem Manager will create this report on a weekly basis for the Problem Management Process Owner.

The reports will include the following key measurements: Number of problems requiring more information; Number of logged versus occurring problems; Number of problems that had the wrong severity assigned; Number of reassignments before a problem is resolved; Number of problem tickets with incorrect information; Number of problems reassigned; Number of problems with circumvention [bypass] procedures in place; Number of problems with inadequate circumvention [bypass] information documented; Number of problems that reoccur after being resolved; Number of problems with inadequate resolution information documented; and Average problem determination duration.

Problem Management Process Summary report provides a high level view of the key measurements used to manage the entire Problem Management Process. The Problem Manager creates this report on a monthly and yearly basis.

Knowledge Management Detailed Report identifies the effectiveness of the use of knowledge in the resolution of incidents and problems. It is created on a by the Knowledge Administrator and contains: Number of candidates identified for Knowledge Management; Number of entries added to Knowledge Management; Number and percentage of incidents resolved using information in the Knowledge Repository; and Number and percentage of problems resolved using information in the Knowledge Repository.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of generating a management solution for a client having an organization, comprising the steps of:
    providing a pre-defined solution of documentation, executable code, and installation aids, having pre-determined processes, roles and skills, and tool function;
    assessing the impact of implementing said solution within said organization of said client;
    building a training plan of needed training in response to said impact;
    defining a client data processing infrastructure needed to implement said pre-defined solution at said client;
    identifying said pre-determined processes, roles and skills, and tool function requiring changes for said client;
    completing change worksheets with said client;
    processing said change worksheets to generate personalized executable code for said changes;
    running test cases on said solution with said changes; and
    delivering said data processing infrastructure, said documentation, said personalized executable code, said installation aids, and said needed training to said client.

2. A method according to claim 1, wherein the providing step includes the steps of:
    accessing a database having a set of documentation, a set of executable codes, and a set of installation aids; and
    selecting from the database at least one of the set of documentations, at least one of the set of executable codes, and at least one of the set of installation aids.

3. A method according to claim 1, wherein the step of processing said change worksheets includes the steps of:
    providing a list of personalization options;
    selecting one of the personalization options from the list; and
    further personalizing the selected option to generate the personalized executable code.

4. A method according to claim 1, wherein said pre-determined processes are best-of-breed processes.

5. A method according to claim 1, wherein the providing step includes the steps of providing a menu of available services; and selecting from said menu, services included in the pre-defined solution.

6. A method according to claim 5, wherein the step of selecting from the menu includes the step of said client selecting from the menu, services included in the pre-defined solution.

7. A system for generating a management solution for a client having an organization, said system comprising:
    means providing a pre-defined solution of documentation, executable code, and installation aids, having pre-determined processes, roles and skills, and tool function;
    means for assessing the impact of implementing said solution within said organization of said client;
    means for building a training plan of needed training in response to said impact;
    means for defining a client data processing infrastructure needed to implement said pre-defined solution at said client;
    means for identifying said pre-determined processes, roles and skills, and tool function requiring changes for said client;
    means for completing change worksheets with said client;
    means for processing said change worksheets to generate personalized executable code for said changes;
    means for running test cases on said solution with said changes; and
    means for delivering said data processing infrastructure, said documentation, said personalized executable code, said installation aids, and said needed training to said client.

8. A system according to claim 7, wherein the providing means includes:
    means holding a database having a set of documentation, a set of executable codes, and a set of installation aids; and
    means for selecting from the database at least one of the set of documentations, at least one of the set of executable codes, and at least one of the set of installation aids.

9. A system according to claim 7, wherein the means for processing said change worksheets includes:
    means providing a list of personalization options;
    means for selecting one of the personalization options from the list; and
    means for further personalizing the selected option to generate the personalized executable code.

10. A system according to claim 7, wherein said pre-determined processes are best-of-breed processes.

11. A system according to claim 7, wherein the providing means includes means for providing a menu of available services; and means for selecting from said menu, services included in the pre-defined solution.

12. A system according to claim 11, wherein said client selects from the menu, services included in the pre-defined solution.

13. A program storage device readable by machine, tangibly embodying a program of instructions executable by the machine to perform method steps for generating a management solution for a client having an organization, said method steps comprising:
    providing a pre-defined solution of documentation, executable code, and installation aids, having pre-determined processes, roles and skills, and tool function;
    assessing the impact of implementing said solution within said organization of said client;
    building a training plan of needed training in response to said impact;

defining a client data processing infrastructure needed to implement said pre-defined solution at said client;

identifying said pre-determined processes, roles and skills, and tool function requiring changes for said client;

completing change worksheets with said client;

processing said change worksheets to generate personalized executable code for said changes;

running test cases on said solution with said changes; and delivering said data processing infrastructure, said documentation, said personalized executable code, said installation aids, and said needed training to said client.

14. A program storage device according to claim 13, wherein the providing step includes the steps of:

accessing a database having a set of documentation, a set of executable codes, and a set of installation aids; and selecting from the database at least one of the set of documentations, at least one of the set of executable codes, and at least one of the set of installation aids.

15. A program storage device according to claim 13, wherein the step of processing said change worksheets includes the steps of:

providing a list of personalization options;

selecting one of the personalization options from the list; and further personalizing the selected option to generate the personalized executable code.

16. A program storage device according to claim 13, wherein said pre-determined processes are best-of-breed processes.

17. A program storage device according to claim 13, wherein the providing step includes the steps of providing a menu of available services; and selecting from said menu, services included in the pre-defined solution.

18. A program storage device according to claim 17, wherein the step of selecting from the menu includes the step of said client selecting from the menu, services included in the pre-defined solution.

* * * * *